Patented July 2, 1940

2,206,351

UNITED STATES PATENT OFFICE 2,206,351

PREPARATION OF ALIPHATIC ACID NITRILES

Richard Greenhalgh, Blackley, Manchester, England, assignor to Imperial Chemical Industries Limited, a corporation of Great Britain No Drawing. Application December 23, 1937, Serial No. 181,458. In Great Britain December 29, 1936

4 Claims. (Cl. 260—404)

This invention relates to a process for the manufacture of higher aliphatic nitriles.

By the interaction of acetamide and liquid phosgene in a sealed tube at 50° C., Schmidt (Jour. für Praktische Chemie 1872 (2) 5, 63) obtained a solid compound having the empirical formula $C_5H_8N_2O_3$ together with some oily drops of acetonitrile and acetyl chloride.

Richter—Organische Chemie, Bonn 1909, vol. 1, page 489 states that diacetylurea is obtained from acetamide and phosgene.

It was therefore not to be foreseen that by reacting higher aliphatic amides with phosgene there would be obtainable excellent yields of higher aliphatic nitriles.

This invention has as an object the provision of a new process for making higher aliphatic nitriles having at least eight carbon atoms. Other objects will appear hereinafter.

These objects are accomplished by the following invention wherein phosgene is reacted with an aliphatic carboxylic acid amide having at least eight carbon atoms.

The more detailed practice of the invention is illustrated by the following examples, wherein parts given are by weight unless otherwise stated. There are of course many forms of the invention other than these specific embodiments.

Example 1

One hundred and six parts of technical stearamide (prepared from technical stearic acid and comprising a mixture of the amides of palmitic and stearic acids) is melted and heated to 100° C. A stream of phosgene is passed into the molten amide until (about 1½ to 2 hours) a sample of the reaction mixture remains liquid when cooled to 30° C. The total reaction mixture is then distilled under diminished pressure whereby a technical quality stearonitrile (comprising a mixture of stearonitrile and palmitonitrile) is obtained as a colorless oil, B. P. 195–218° C./17 mm. which sets on cooling to atmospheric temperature to a white crystalline mass. The yield of nitrile is 90% of the theoretical.

Example 2

200 parts of technical oleamide are melted and heated to 120°–130° C. A slow stream of phosgene is passed through the molten amide until a sample of the reaction mixture remains liquid when cooled to room temperature. Air is then blown through the mixture to remove hydrogen chloride and unreacted phosgene and finally the residue is distilled under diminished pressure. There are thus obtained 120 parts of a technical quality of oleonitrile in the form of a colourless oil, B. P. 205–215° C./13 mm.

Example 3

The mixture of amides obtained by heating the mixed acids of coconut oil with ammonia is phosgenated in a manner similar to that described in Example 2. From 50 parts of mixed amides there are thus obtained 26 parts of the corresponding mixed nitriles in the form of an oil, B. P. 145°–160° C./11 mm.

Interaction may conveniently be brought about in any suitable vessel by passing a stream of phosgene through the molten amide, but it is preferable to work under such conditions that the volatile reaction products can escape from the reaction mixture. Again, for example, the reagents may be heated together in presence of an inert solvent such as, for example, toluene or xylene.

The reaction is preferably carried out at a temperature of 100–150° C., but temperatures lying outside these limits may likewise be used.

The process of the present invention is generically applicable to the reaction of phosgene with aliphatic carboxylic and preferably aliphatic monocarboxylic acid amides of at least eight carbon atoms and having at most one unsaturated linkage. The preferred amides are those of the saturated fatty acids having at least twelve carbon atoms.

The invention is thus applicable to the amides of pelargonic, capric, undecyclic, lauric, myristic, palmitic, margaric, stearic, arachic, behenic, cerotic, melissic, oleic, elaidic, isostearic and pentadecanoic acids.

While the process is of generic applicability to amides of saturated and singly unsaturated aliphatic carboxylic acids, the results obtained with amides of singly unsaturated acids, e. g. oleamide, are inferior to those obtained with amides of saturated acids, e. g. stearamide, and a preferred phase of the invention is therefore the reaction of phosgene with saturated carboxylic acid amides, and particularly saturated monocarboxylic acid amides, of at least eight carbon atoms.

While in the examples above, phosgene is reacted with a mixture of fatty acid amides, the process is applicable with favorable results also to the reaction of phosgene with pure amides and thus to reaction with pure stearamide, oleamide, etc. Mixtures of amides prepared in known manner from naturally occurring fats and oils such as stearin, coconut, palm and olive oils, etc. may be employed.

The process of the present invention has several advantages over the known methods of manufacturing aliphatic nitriles such as for example, the method whereby aliphatic amides are dehydrated by means of phosphorus pentoxide. The process of the present invention is more convenient in manipulation and requires only cheap and easily available starting materials. Higher aliphatic nitriles obtainable by means of the present invention, many of which are known compounds, are useful synthetic reagents. They may be employed, for example, in the production of higher alkylamines, iminoethers and amidines.

The above description and examples are intended to be illustrative only. Any modification of or variation therefrom which conforms to the spirit of the invention is intended to be included within the scope of the claims.

I claim:
1. Process of preparing nitriles which comprises heating in the essential absence of an acid acceptor phosgene with the amide of a fatty acid having at least eight carbon atoms and having at most a single unsaturation.
2. Process of preparing nitriles which comprises heating in the essential absence of an acid acceptor phosgene with the amide of a saturated fatty acid of at least eight carbon atoms.
3. Process of preparing nitriles which comprises heating in the essential absence of an acid acceptor phosgene with the amide of stearic acid.
4. Process of preparing nitriles which comprises heating in the essential absence of an acid acceptor phosgene with the amide of an aliphatic carboxylic acid of at least eight carbon atoms.

RICHARD GREENHALGH.